Nov. 2, 1965　　　L. L. GIBBS, SR　　　3,215,090
VEHICLE TRANSPORT CAR LOADING AND UNLOADING SYSTEM
Filed May 1, 1964　　　2 Sheets-Sheet 1
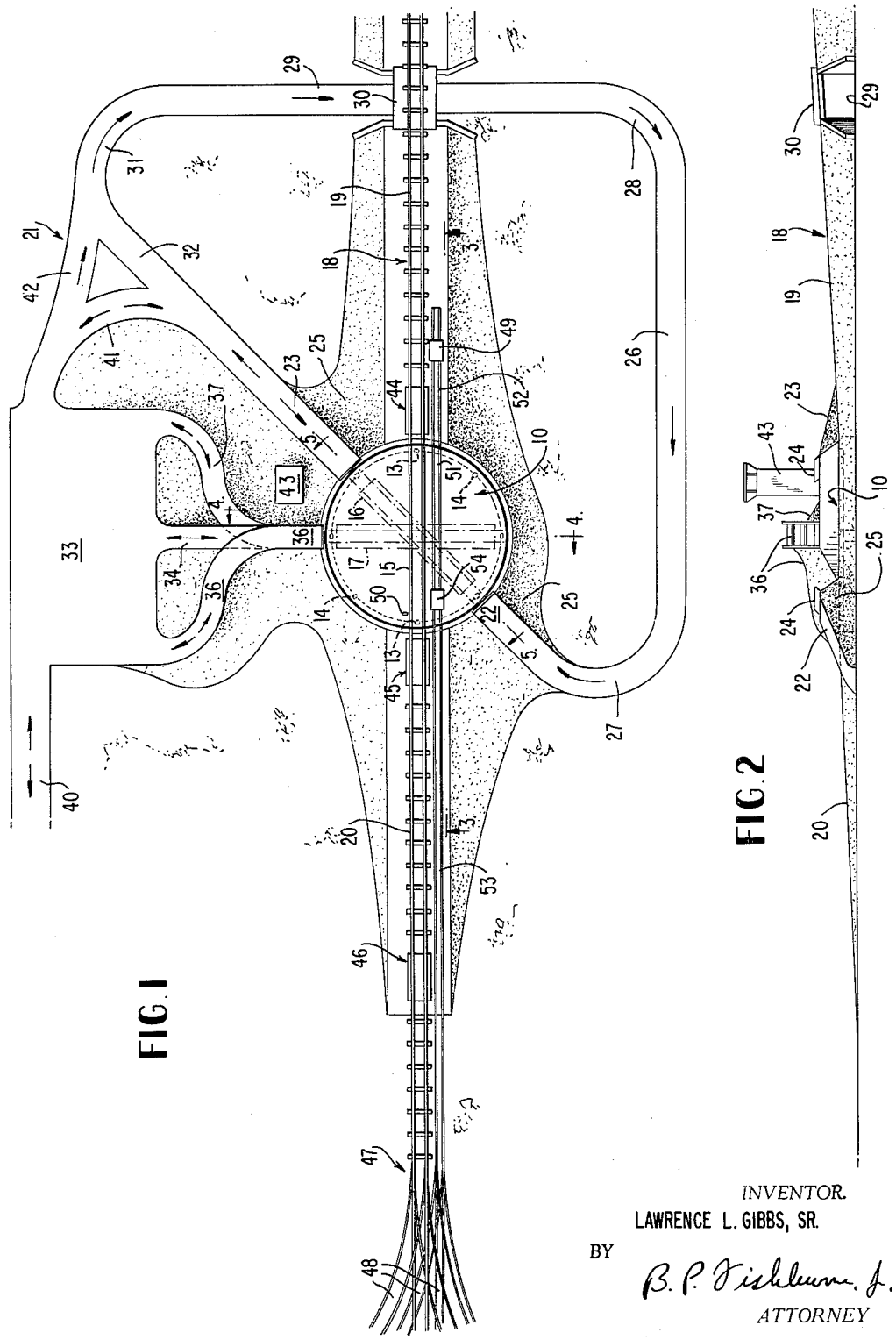
INVENTOR.
LAWRENCE L. GIBBS, SR.
BY
B. P. Fishburn, Jr.
ATTORNEY

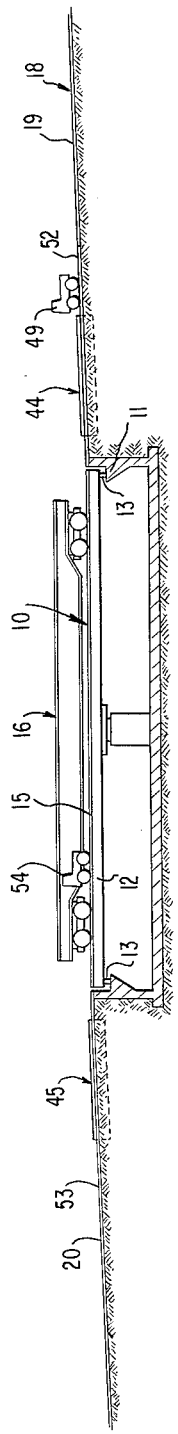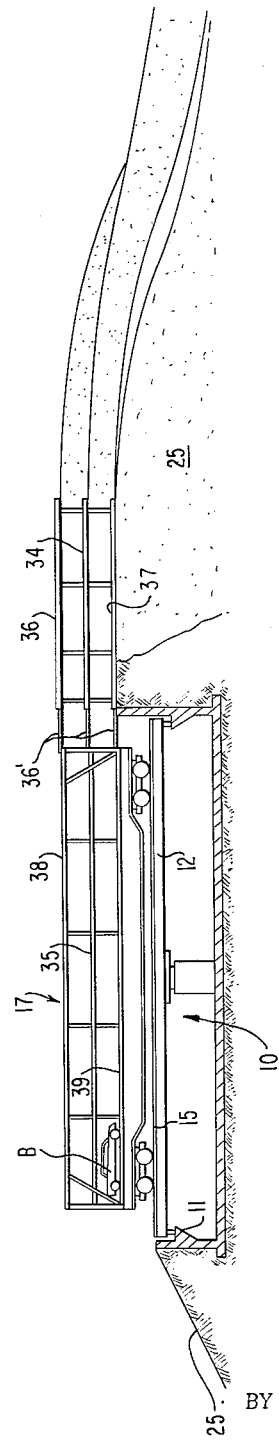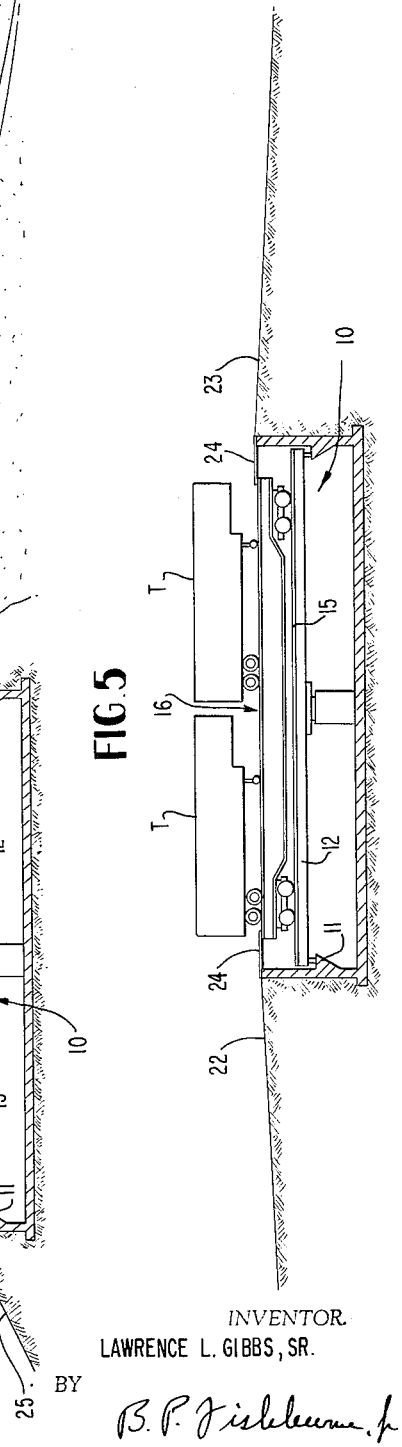

United States Patent Office 3,215,090
Patented Nov. 2, 1965

1

3,215,090
VEHICLE TRANSPORT CAR LOADING AND
UNLOADING SYSTEM
Lawrence L. Gibbs, Sr., 3321 46th St.,
New Brighton, Pa.
Filed May 1, 1964, Ser. No. 364,215
9 Claims. (Cl. 104—27)

My invention relates to a loading and unloading system for vehicle transporting railway cars.

More particularly, the invention pertains to permanently installed apparatus which is employed selectively in the loading or unloading of automobile transport cars of the three level type or flat cars which commonly transport trailer truck bodies in the "piggy-back" fashion.

My loading and unloading system for these two types of railway cars has for its primary purpose to greatly simplify the procedure and greatly reduce the labor and time now commonly incident to loading and unloading truck bodies and automobiles from the two mentioned types of railway cars.

Conventionally, the flat bed railway cars each having a pair of truck trailer bodies suitably lashed thereon are conveyed in train form to a suitable freight yard and the laborious task of unloading usually involves the use of an automotive truck tractor to couple up with and pull each successive trailer body lengthwise from the train of cars. In some cases, the train of cars might be broken down or separated to some extent but the time and labor involved for unloading is enormous and the operation is very inefficient and costly.

Similarly, in the loading and unloading of the modern-type three level auto transporting railway cars, carrying up to fifteen automobiles each, it is customary to uncouple each such transporting car and remove the automobiles from one end thereof by means of a special pair of ramps which have to be manually positioned at the proper levels adjacent the end of the car. After unloading, the transporting car would have to be recoupled in the train so that it would be conveyed away. There are some variations in the conventional procedure but there is presently no efficient, rapid or economical way to load and unload either above-mentioned type of vehicle transporting railway car. Accordingly, it is the prime object of the invention to provide a system for this particular purpose which will be highly efficient in operation, time-saving, labor-saving, safe and requiring very little expense for maintenance after initial installation.

A further object of the invention is to provide a loading and unloading system of the mentioned character which may be installed in, or in connection with, an existing railway freight yard having feeder tracks and classification tracks, the system also including a turntable arrangement and certain concrete vehicular ramps and access ways which coact with the turntable and a gravity track system to make up the complete invention system.

Another important object is to provide a car loading and unloading system of the mentioned type which utilizes existing and conventional railway rolling stock and does not necessitate the provision of specially designed rolling stock which is impractical and would prohibitively increase railway costs if attempted on a wide scale.

2

Certain special railway cars are known to the prior art including cars having turntable means mounted directly thereon to facilitate side loading and unloading. While such specialized cars may represent another solution to the same broad problem, nevertheless this alternate solution would necessitate the building of great new fleets of cars at a huge expense to the railroads. One of the chief virtues of the invention system resides in the fact that existing rolling stock may be employed and the entire system is a permanently installed arrangement capable of handling large numbers of conventional railway cars in a very efficient manner and at minimum cost including the cost of upkeep of the system per se. The invention, therefore, differs distinctly from the prior art in that it does not employ specially designed rolling stock but relies upon a novel manipulation of existing rolling stock.

Other objects and advantages of the invention will be apparent during the course of the following description.

In the accompanying drawings forming a part of this application and in which like numerals are employed to designate like parts throughout the same, FIGURE 1 is a diagrammatic plan view of a railway car loading and unloading system embodying the invention;

FIGURE 2 is a side elevation of the system;

FIGURE 3 is a fragmentary, partly diagrammatic, longitudinal vertical section taken substantially on line 3—3 of FIGURE 1;

FIGURE 4 is a similar transverse vertical section taken on line 4—4 of FIGURE 1; and FIGURE 5 is a similar section taken on line 5—5 of FIGURE 1, FIGURES 3, 4 and 5 all being on a somewhat enlarged scale.

In the drawings, wherein for the purpose of illustration is shown a preferred embodiment of the invention, the numeral 10 designates generally a circular turntable which is horizontal and arranged at a convenient elevation to allow for equipment maintenance. The turntable 10 includes a suitable elevated supporting base or track 11, upon which is mounted the turntable structure 12 having a desirable number of powered rollers 13, or the like, and intermediate idler rollers 14, as shown in FIGURE 1. The turntable 10 has a single diametrical track section 15 fixedly mounted thereon to turn bodily therewith under influence of the turntable driving means. The construction of the turntable per se is generally conventional and requires no further detailed description herein, other than to state that by conventional control means the turntable can be revolved and locked in selected adjusted positions. The diameter of the turntable 10 and the length of its track section 15 is such that the turntable may accommodate one flat bed railway car 16 used to transport a pair of trailer truck bodies T or one three level automobile transport car 17 used to transport fifteen automobiles B or the like.

In conjunction with the power-operated turntable 10, the invention system comprises a main longitudinal gravity track 18 having an incoming slightly inclined track section 19 and an outgoing similarly inclined track section 20, as shown in the drawings. The incoming and outgoing gravity track sections 19 and 20 lead up to the level of the horizontal track section 15 on the turntable so that the ends of the latter may register exactly with the track sections 19 and 20, thus enabling a train of cars or a single car to pass directly over the turntable from the incoming track 19 to the outgoing gravity track 20. It will be noticed in FIGURE 3 that the supporting structure for the turntable 10 is recessed below the grade of the gradually inclined gravity track 18. The turntable 10 per se is level and is positioned at the level or elevation of the gravity track in FIGURE 3.

The system further comprises in conjunction with the turntable 10 and main straight gravity track 18, an automotive vehicle paved runway component shown generally at 21 and comprising an inclined access ramp 22 for automotive trucks and truck tractors. The ramp 22 extends radially from one side of the turntable 10 and diagonally of the gravity track 18, FIGURE 1. The access ramp 22 slopes gradually upwardly from a horizontal base elevation to an elevation somewhat above the level of the turntable track 15, FIGURE 5, and in alignment with the bed of the car 16 when the latter is on the turntable, see FIGURE 5. Diametrically opposite the radial access ramp 22, a similarly inclined trailer truck loading and unloading ramp 23 is provided to cooperate with the turntable and the car 16 thereon. As shown in FIGURE 5, the tops of the two ramps 22 and 23 are both at the elevation of the bed of car 16 and thus above the turntable track 15. As will be more apparent during the following description, the various grades or elevations of the component parts of the system in their relation to the turntable elevation form an important part of the invention.

As further shown in the drawings, each ramp 22 and 23 is provided at its upper end with a manually operated or power operated hinged steel loading ramp 24 adapted to bridge the small space between the ends of the car 16 on the turntable and the adjacent ramp 22 or 23. The numeral 25 designates diagrammatically the embankment or grading employed to elevate the ramps 22 and 23 to the proper levels and to properly position the straight gravity track 18 relative to the turntable. It should be apparent from a comparison of FIGURES 3 and 5 and from the previous description that the tops of the ramps 22 and 23 are somewhat above the gravity track sections 19 and 20 at the points where the latter meet the opposite sides of the turntable track 15.

The radial access ramp 22, for loading only onto the turntable mounted car 16, is fed by longitudinal paved way 26 parallel to the track 18 and connected with the ramp 22 by an elbow 27. Another elbow 28 connects the longitudinal way 26 with a cross way or pavement strip 29, running at right angles to the track 18 and below the level of the incoming gravity track portion 19 and crossing the same, as shown in FIGURE 1. To render this possible, a bridge 30 is constructed over the pavement strip 29, as shown in FIGURES 1 and 2, and the bridge is conventional. The bridge provides adequate clearance for trailer trucks to pass under it on the pavement strip 29 in the direction of the arrows.

Another elbow 31 interconnects the pavement strip 29 with a further radial pavement strip 32 leading directly to the inclined ramp 23 and being diagonal to the track 18. The paved portions 22, 23, 32, 29, 26, etc. may be seen in FIGURE 1 to constitute a generally triangular loop of roadway connecting with the turntable track section 15 when the latter is arranged diagonally as shown in dotted lines in FIGURE 1. In such position of the turntable, the car 16 thereon is loaded or unloaded via the ramps 22 and 23 and associated paved ways in a manner to be further described. It should also be understood that this particular portion of the system is concerned entirely with the loading and unloading of the trailer truck bodies T which are piggy-backed on the flat type car 16.

The invention system further comprises as a part of the paved component 21 means cooperating with the turntable 10 for loading and unloading automobiles from the three level cars 17 while any one such car is on the turntable, and the track section 15 is extending at right angles to the gravity track 18 as shown in broken lines in FIGURE 1.

The last-mentioned means includes a broad intermediate level paved area 33 having a radial intermediate level ramp 34 extending therefrom, FIGURES 1 and 4, and leading to the edge of the turntable 10 and being at the same elevation as the intermediate floor 35 of three level car 17. Similarly, an upper level loading and unloading ramp 36 and a lower level loading and unloading ramp 37 lead from the paved area 33 and are arranged respectively above and below the intermediate ramp 34 as best shown in FIGURE 4. The top ramp 36 is at the elevation of the top floor 38 of car 17 and the bottom ramp 37 is at the elevation with the bottom level or floor 39 of car 17. As shown in FIGURES 1 and 4, the three superposed ramps 34, 36 and 37 are employed at one side only of the turntable 10 and the three ramps are at right angles to the main gravity track 18, as distinguished from the ramps 22 and 23 which are diagonally arranged. By virtue of the above ramp arrangement, the fifteen automobiles B on each car 17 on the turntable 10 may be quickly driven under their own power off or onto the several levels of the car 17, when the turntable has been properly positioned relative to the ramps, as will be more fully described.

The paved area 33 may be connected with a paved roadway 40 leading to a suitable large parking area for automobiles or trucks or both. Additional paved strips 41 and 42 interconnect the paved area 33 with ramp 23 and the elbow 31, as shown.

A suitable control tower or traffic tower 43 may be provided at the point indicated for the overall regulation of the system. This is an optional feature. The tower 43 could contain the master controls for the turntable and other moving components yet to be described. Other control locations or arrangements could be employed, if preferred.

It will be observed by a comparison of FIGURES 4 and 5 that the top of ramp 37 is at about the same elevation as the tops of ramps 22 and 23. The ramp 37 is level with the bed or first level 39 of three level car 17. The upper ramps 34 and 36 are well above ramps 37 and 22 and 23 and lead to the intermediate and upper levels 35 and 38 of the car 17. The several levels of the system ramps are well shown in FIGURE 2 of the drawings. The ramps 36, 34 and 37, FIGURE 4, each have hinged manually or power-operated steel ramps 36' to bridge the gap between the fixed ramps and the three floor levels of the transporting car 17. The extension ramps 36' may slide horizontally toward and from the car 17 if preferred.

The remainder of the invention system comprises means to aid in the manipulation of railway cars on the gravity track 18 and turntable. While this means could be in several different forms, one preferred arrangement is shown diagrammatically in the drawings. Near one side of the turntable 10, a conventional car retarding and braking device 44 is provided to arrest the movement of each car 16 or 17 as the same is allowed to pass down the incoming gravity track 19 into the system. The retarder 44 may be of the air operated type which acts upon the wheels of the railway car, and this is well known in the art and need not be described in detail herein. A second such braking and retarding unit 45 may be installed at the opposite side of the turntable 10 near the top of the outgoing gravity track 20, and if desired still another retarder unit 46 may be installed near the low end of the outgoing gravity track 20 just ahead of a switch section 47 which operates to shunt the outgoing cars onto regular classification tracks 48, any number of which may be utilized in the system. In this manner, suitable trains may be made up on the classification tracks consisting of full or empty cars 16 or 17 and possibly other rolling stock. The use of classification tracks is well known in the art.

To operate in conjunction with the turntable, inclined gravity track 18 and the retarders 44, 45, etc., there is provided some form of power-operated car starting and transferring means and this is shown diagrammatically in FIGURE 1 and may comprise a first electric-powered "skip buggy" or car 49 to engage each car 16 or 17 being held by the retarder 44 and transfer it onto the track section 15 of the turntable until such car engages a positive stop 50 on the turntable. The skip buggy 49 operates on its own track 51, a section of which is on the movable turntable close to and parallel to the main track section 15. The track 51 also has fixed sections 52 and 53 on opposite sides of the turntable. The skip buggy or car 49 can be electric-powered or powered with a small diesel engine or the like with suitable means to engage the railway car 16 or 17 on the main track and advance it onto the turntable slowly, after which the skip buggy 49 is returned to the position shown in FIGURE 1.

A second similar skip buggy 54 is depicted in FIGURE 1 to engage the car already on the turntable and transfer it after loading or unloading to the outgoing track section 20. The buggy 54 will engage a particular car on the track section 15 when the latter is aligned with the tracks 19 and 20 and transfer the car to the retarder 45, for example. Subsequently, this retarder may release the car for gravity passage on to the second retarder 46, if such is employed, or on to the classification tracks 48. Again slight variations in the arrangement and use of this portion of the apparatus is contemplated within the scope of the invention. For example, it may be desirable to employ only one of the skip or transfer buggies 49 or 54 instead of two. In some installations, the transfer buggies might be mounted on monorail tracks rather than dual tracks. A greater or lesser number of the retarders could be utilized on the gravity track 18. Magnetic car holding devices of a well-known type could be used instead of pneumatic retarders. It is thought that these variations will be readily apparent to and understood by those skilled in the art, without the need for any further explanation.

The operation of the system is briefly as follows:

A train of cars or more usually individual cars of either type 16 or 17 are suitably advanced onto the incoming gravity track section 19 at some point beyond the bridge 30. Each such car will gravitate down the track 19 to the first retarding device 44 where it will be engaged and stopped just short of the turntable 10. The turntable will be positioned with its track section 15 aligned with gravity track 18 and the retarding device 44 will then release the car and the transfer buggy 49 will engage the car and shift it onto the level turntable within the confines thereof and into engagement with the car stop or holder 50 which may be a magnetic device or some mechanical stop or holding device on the turntable.

Assuming that the car being handled is the car 16 for the two trailer truck bodies T, and that the car 16 is empty, the turntable will be adjusted so that the track section 15 and empty car 16 are set diagonally and in alignment with ramps 22 and 23. The steel ramps 24 are now lowered and a first tractor-trailer assembly is driven from the parking area beyond 40 onto the pavement strip 42 and then around the strips 31, 29, 28, 26 and 27 and up the ramp 22 to the turntable 10. This first tractor trailer assembly is then separated on the turntable and the trailer body T is now positioned on the rear half of the car 16 nearest the ramp 22 and facing forwardly toward the ramp 23, FIGURE 5. The tractor from this assembly or unit now drives forwardly off of the car 16 and down the ramp 23 and around the strip 41 and back to the parking area. Immediately thereafter, a second tractor-trailer unit backs around the strip 41 and up the ramp 23 to deposit its trailer body T on the remaining empty half of the car 16 nearest the ramp 23. The two truck trailer bodies are now facing in the same direction on the car 16, FIGURE 5, and are of course lashed down according to conventional procedure. The tractor of the second trailer truck unit now merely returns forwardly to the parking area via the ramp 23, strip 41, etc.

The portable ramps 24 are again lifted and the turntable 10 is again turned to place the track section 15 and car 16 in line with the track 18. The stop 50 is now caused to release the loaded car 16 and the transfer buggy 54 may shift the loaded car to the first retarder 45 on the down-grade side of the turntable. From here on, depending upon the precise arrangement of equipment, the loaded car will be gravity transferred to the proper classification track 48.

If the car 16 above described had already been loaded with two trailer truck bodies when placed on the turntable, as described, and aligned with the ramps 22 and 23, the unloading procedure would be the following. The first and second trailer-tractors, not shown, would be in succession back up to the ramp 23 and couple up with the fifth wheel of each trailer body T on the car 16 and tow it off forwardly down the ramp 23 and around the strip 41 to the parking area. The second tractor would perform the same operation to remove the second body T from the car 16, as soon as the first tractor and body had cleared the area.

Assuming further that the car being manipulated by the system is one of the cars 17 for automobiles, then such car would be placed on the turntable initially in the same manner above-described for the car 16. However, after placement on the turntable, the turntable would be adjusted and held with its track section 15 and the car 17 in alignment with the multiple level ramps 36, 34 and 37, see FIGURE 4. That is to say, the car 17 would now be held at right angles to the gravity track 18. In such position and merely by positioning the portable ramps 36′, workmen can readily drive the fifteen automobiles on the car 17 forwardly over the ramps 36, 34 and 37 and onto the area 33 and finally to the roadway 40 and parking area. This unloading can be done in a very rapid manner and with safety and without necessity for any external ramp equipment such as presently needed to unload the three level cars 17. Likewise, the loading of an empty car 17 while positioned as in FIGURE 4 is a simple matter utilizing the three ramps 36, 34 and 37 which lead lengthwise directly onto the three levels 38, 35 and 39 of the car 17. No backing up is required for loading or unloading the fifteen automobiles on the car 17 from the ramp system, and it is merely necessary when loading or unloading to position the turntable so that the automobiles will be headed in the proper direction for forward driving onto or off of car 17.

It should now be apparent that this composite system of trackage, turntable, permanently installed ramps and ways and simple car transfer mechanism greatly simplifies and renders much more efficient the operations of loading and unloading both the piggy-backed trailer truck bodies on the cars 16 and the automobiles on the three level cars 17. These two types of cars may be unloaded or loaded selectively in any order by means of the turntable its coaction with the ramps 22 and 23 on the one hand and the ramps 36, 34 and 37 on the other hand. There is a direct coaction between the turntable 10 and the gravity track 18 during the loading or unloading of either type car.

The invention system may also be used in a somewhat different manner without rolling individual cars down the gravity track 18 to the retarders and transfer equipment, although this is the preferred manner of use. An entire train containing one or more of either or both types of cars 16 and 17 could be run onto the track 18 and selected cars brought to rest one at a time on the turntable and uncoupled from the train and manipulated by the turntable in conjunction with the ramps in the exact manner above described. After loading or unloading is completed, the turntable could place the particular car back into the train and after recoupling, the train could advance the car from the turntable and place another car thereon, etc.

Regardless of how the system is employed, it is certain to be a tremendous step forward in efficiency, speed of operation and economy over present conventional methods of loading and unloading cars of the type designated 16 and 17. As stated, special equipment of a portable nature is required to load and unload the cars 17 when they have been disconnected from a train. The conventional manner of loading and unloading the piggy back cars 16 involves the laborious backing-up of tractor-trailers or tractors along long lines of coupled flat bed cars. This is a very slow procedure and hazardous and very costly.

It is to be understood that the form of the invention herewith shown and described is to be taken as a preferred example of the same, and that various changes in the shape, size and arrangement of parts may be resorted to, without departing from the spirit of the invention or scope of the subjoined claims.

Having thus described my invention, I claim:

1. A system for loading or unloading vehicle transporting railway cars comprising in combination a slightly inclined car transfer track, a substantially level turntable built into said track between the ends thereof and carrying a track section alignable with the transfer track, and a pair of ramps spaced circumferentially of the turntable relative to said transfer track, said ramps leading to and from opposite sides of the turntable at an elevation above the turntable and somewhat above the transfer track, whereby vehicles ascending said ramps may pass directly onto a flat bed railway car on the turntable aligned with said ramps or pass from said car onto said ramps.

2. A system for selectively loading or unloading vehicle transporting railway cars comprising an inclined gravity track, a turntable arrange between the ends of the gravity track and having a track section alignable with the gravity track at the elevation of the gravity track, a first pair of inclined ramps spaced circumferentially of the turntable relative to said gravity track, said ramps leading to and from diametrically opposite sides of the turntable at an elevation above the turntable and gravity track and substantially flush with the bed of a railway flat car on the turntable aligned with said ramps, and a multiple level ramp leading radially from one side of the turntable and spaced circumferentially from said first pair of ramps and arranged at an angle to the gravity track and including a lower level ramp spaced above the turntable at the elevation of the lower floor of a multi-level railway car on the turntable aligned with said multiple level ramp, said multiple level ramp also including at least one upper level ramp spaced above said lower level ramp and at the elevation of an upper floor of said railway car.

3. A system for selectively loading and unloading vehicle transporting railway cars comprising a substantially straight inclined gravity track, a turntable constructed in the gravity track and having a track section alignable with the gravity track, car retarding means for the gravity track near opposite sides of the turntable, car transfer means associated with the gravity track and turntable for shifting individual cars onto and off of the turntable, a pair of ramps leading from diametrically opposite sides of the turntable at an elevation above the turntable track section and extending diagonally of the gravity track, a pavement strip in loop form interconnecting said ramps and crossing the gravity track on an elevation separated therefrom vertically, and another ramp extending radially from the turntable and spaced circumferentially therearound relative to said pair of ramps and extending at an angle to the gravity track, the last-named ramp having multiple levels the lowest of which is substantially at the elevation of said pair of ramps and the upper levels of which are spaced substantially above said lowest level and above the elevation of said pair of ramps for alignment with the floors of multi-level railway cars.

4. Means to facilitate loading and unloading of vehicle transporting railway cars comprising a main railway car transfer track, a turntable built into said transfer track at the level thereof and having a track section mounted thereon to turn therewith and alignable with the transfer track, said turntable adapted to receive a single multiple level vehicle transporting car, a multiple level car loading and unloading ramp structure radiating from the turntable and extending at an angle to said transfer track and including separated ramp levels at the elevations of the levels of said car, the lowermost ramp level being at an elevation above the elevation of the turntable, inclined runways leading from said multiple ramp levels, and a vehicle transfer area communicating with the bottoms of said runways and common thereto.

5. A system to facilitate the loading and unloading of vehicle transporting railway cars comprising a substantially straight inclined gravity track over which cars enter the system and leave the system, a turntable constructed in said gravity track at the elevation of the gravity track and adapted to receive and support a single vehicle transporting car, a pair of inclined ramps for automotive vehicles extending radially of the turntable on opposite sides thereof and diagonally of the gravity track and alignable with said car on the turntable, the tops of said ramps projecting above the level of the turntable and gravity track so as to be substantially flush with the floor of said car on said turntable, and a three level ramp structure radiating from the turntable at another point on the circumference thereof spaced angularly from said pair of ramps and generally transversely of the gravity track, the lowest level of said three level ramp structure being above the elevation of the turntable and at substantially the same elevation as the tops of said pair of ramps, the upper two levels of said three level ramp structure spaced vertically from said lowest level and from each other to align with the floors of a three level vehicle transporting car, whereby the three level ramp structure may be employed to load and unload the three level vehicle transporting car on said turntable when said car and turntable are turned to align the car with the ramp structure.

6. The invention as defined by claim 5, and wherein the three level ramp structure is arranged substantially at right angles to the gravity track and said pair of ramps are arranged at an angle of approximately 45 degrees to the gravity track.

7. The invention as defined by claim 5, and movable ramp elements at the tops of said inclined ramps and at the leading ends of the three level ramp structure to bridge the gaps between the cars on the turntable and said ramps and three level ramp structure.

8. The invention as defined by claim 5, and means associated with the turntable and gravity track to transfer railway cars onto and off of the turntable.

9. A railway car loading and unloading system comprising slightly inclined gravity transfer track to convey railway cars into and out of the system, a level turntable built into said gravity track at the elevation of the gravity track and carrying a track section alignable with the gravity track, car retarder means on the gravity track adjacent the inlet and outlet sides of the turntable, can transfer means near one side of the gravity track and on the turntable for shifting cars on the gravity track onto and off of the turntable, a pair of inclined ramps radiating from opposite sides of the turntable diagonally of the gravity track and having their tops at elevations above the turntable near the periphery of the latter, a substantially level loop runway interconnecting said ramps on opposite sides of the gravity track and including a section crossing the gravity track, there being a tunnel beneath the gravity track for said section, and a multi-level ramp structure radiating from the turntable at another point thereon spaced circumferentially from the pair of ramps and including a lower ramp level whose elevation above the turntable is substantially equal to the elevation of the tops of said pair of ramps at the periphery of the turntable, said multi-level ramp structure also including vertically spaced upper levels above said lower ramp level, and runway means common to the levels of said multi-level ramp structure and arranged substantially at the elevation of the loop runway and communicating therewith.

References Cited by the Examiner

UNITED STATES PATENTS

| | | | |
|---|---|---|---|
| 1,478,676 | 12/23 | Richey | 104—176 |
| 1,738,008 | 12/29 | Johnson | 104—253 |
| 1,819,017 | 8/31 | Drake | 104—38 |
| 2,190,073 | 2/40 | Knudsen | 104—26 |
| 2,190,708 | 2/40 | Fowler | 105—436 |
| 2,858,907 | 11/58 | Brown | 104—26 X |
| 2,894,650 | 7/59 | Black et al. | 214—14 X |
| 3,091,188 | 5/63 | Graham | 104—29 |

ARTHUR L. LA POINT, *Primary Examiner.*